A. G. JOHNSON.
MECHANISM FOR MAKING WIRE FENCES.
APPLICATION FILED JULY 13, 1914.

1,273,374.

Patented July 23, 1918.
3 SHEETS—SHEET 1.

WITNESSES.
J. R. Keller
John F. Will

INVENTOR.
August G. Johnson
By Kay Totten & Powell
attys

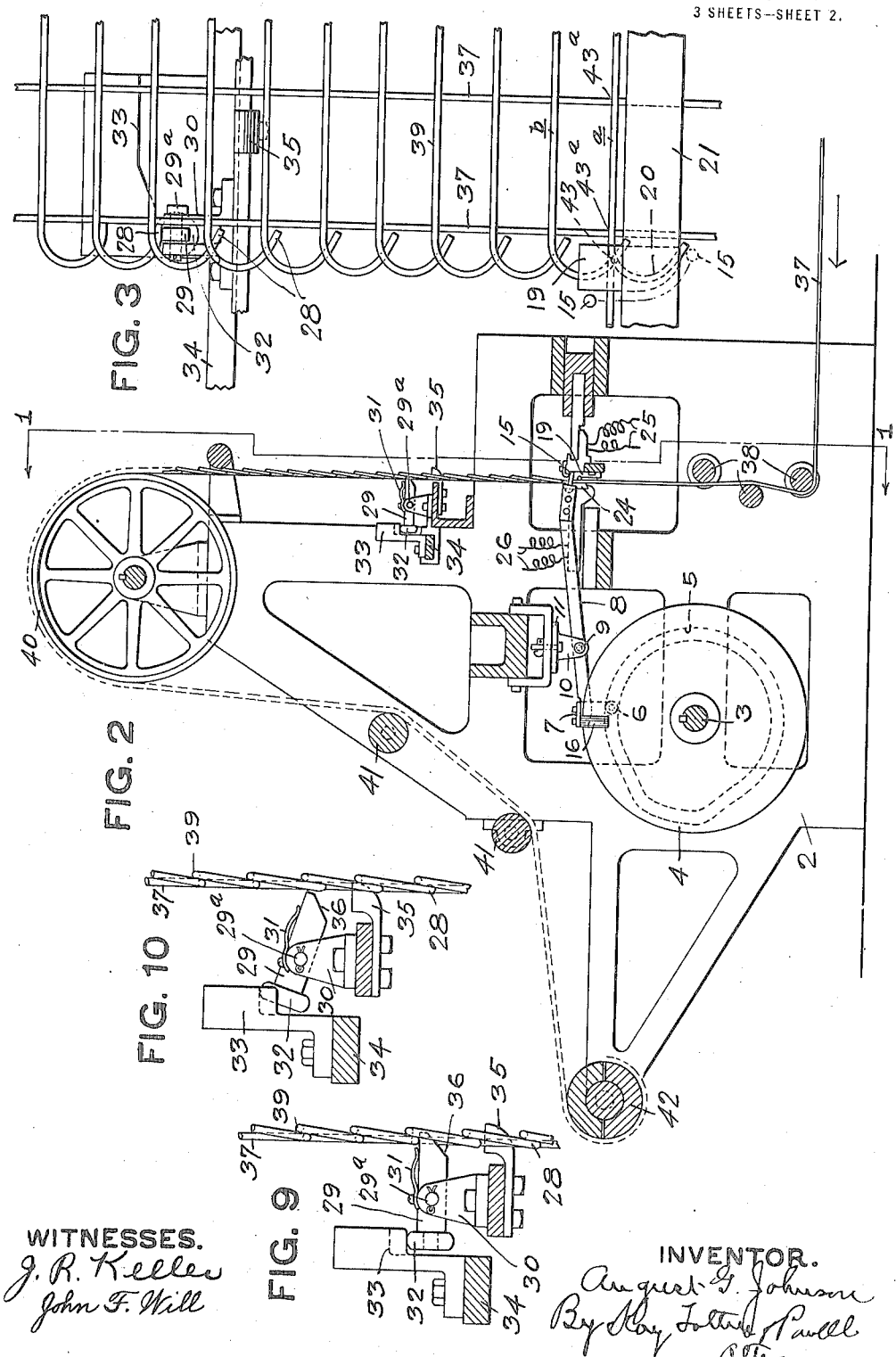

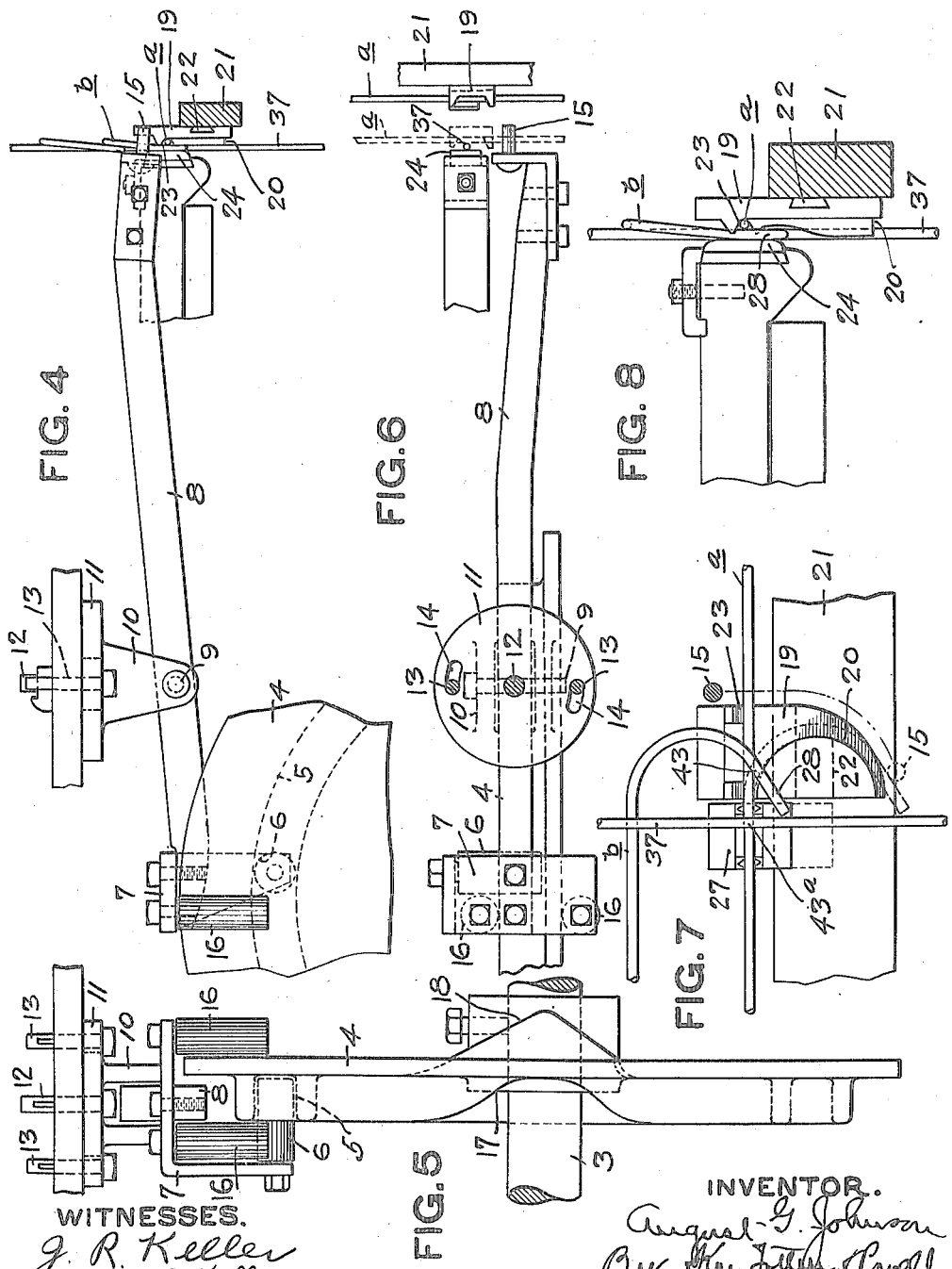

UNITED STATES PATENT OFFICE.

AUGUST G. JOHNSON, OF MONESSEN, PENNSYLVANIA, ASSIGNOR TO PITTSBURGH STEEL COMPANY, OF PITTSBURGH, PENNSYLVANIA, A CORPORATION OF PENNSYLVANIA.

MECHANISM FOR MAKING WIRE FENCES.

1,273,374.    Specification of Letters Patent.    Patented July 23, 1918.

Application filed July 13, 1914. Serial No. 850,716.

*To all whom it may concern:*

Be it known that I, AUGUST G. JOHNSON, a citizen of the United States, and resident of Monessen, in the county of Westmoreland and State of Pennsylvania, have invented a new and useful Improvement in Mechanism for Making Wire Fences; and I do hereby declare the following to be a full, clear, and exact description thereof.

My invention relates to mechanism for the manufacture of fabricated wire-fences of the character set forth and described in an application filed by me February 26, 1914, Serial No. 821,297, said fence consisting of strand-wires and stay wires united at their points of intersection; the strand-wires being the horizontal wires, and the stay-wires the vertical wires, each vertical wire being arched at its upper end, overlapping the adjoining wire, and welded or united thereto.

While machines have been in use for a number years for fabricating wire-fences composed of strand-wires and stay-wires welded at their points of intersection, and in said machines the stay-wires are fed across the intermittently traveling strand-wires and welded thereto at their points of intersection, the present invention goes further and gives an ornamental finish to the top of the fence by providing for the arching of the stay wires and the overlapping of same with the welding of the wires at this overlapping point.

Figure 1:
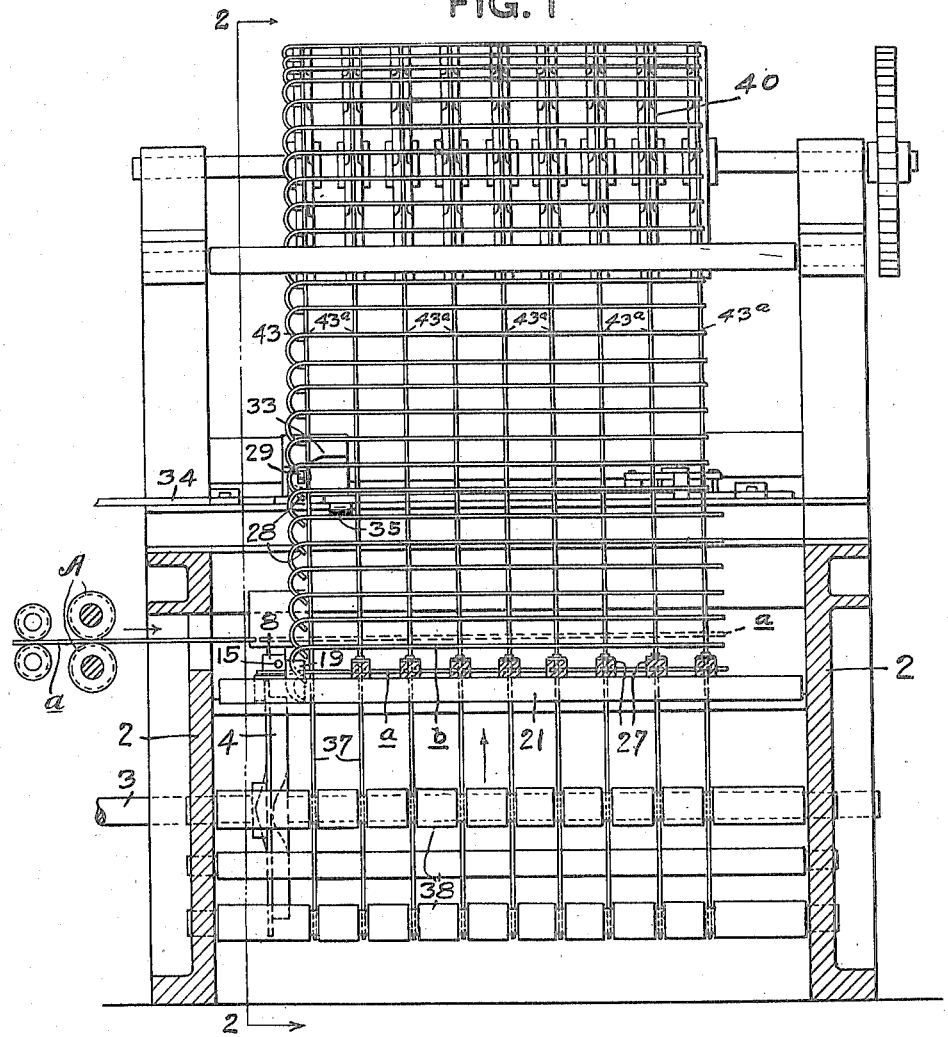
Figure 11:
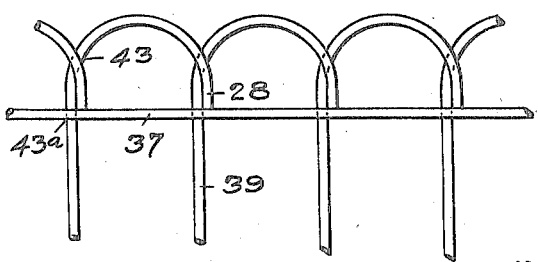

In the accompanying drawings, Figure 1 is a face view showing the fence in process of fabrication, the view being more or less diagrammatical; Fig. 2 is an enlarged sectional view taken on the line 2—2, Fig. 1; Fig. 3 is an enlarged view of a portion of the fence showing the arched top, the arching device being shown in diagram with the device for closing in the free end of the arch; Figs. 4, 5, 6, 7 and 8 show details of the arching mechanism; Figs. 9 and 10 show details of the mechanism for closing the free end of the arch portion, and Fig. 11 shows a portion of the finished fence.

As the machines for fabricating fences formed of strand-wires and stay-wires welded at their points of intersection are very complicated and difficult to illustrate, it has not been deemed necessary to go into all the details of such machines in the illustration of the present mechanism; and for this reason, all the parts going to make up a machine of this character have not been illustrated, but only that required for forming the arched top on a fence of this character.

The numeral 2 designates a suitable frame in which is journaled the driven shaft 3 upon which is mounted the cam 4. The cam 4 is provided with the cam-way 5 engaged by the roller 6, carried by the bracket 7. The forming-bar 8 is bolted or otherwise secured to the bracket 7, and said forming-bar is connected by the pivot-pin 9 to the bracket 10. This bracket 10 has the plate 11, and a pin 12 forms a pivot for said plate upon which the said plate is adapted to turn; the turning movement of said plate being controlled by the studs 13 engaging the slots 14 in said plate. By this construction, the forming-bar 8 has a vertical movement on the pin 9, and has likewise a horizontal movement due to the plate 11 turning on the pin 12. The outer end of the forming-bar 8 has the forming-pin 15, which engages the upper end of the stay-wire and bends the same over a suitable former, as fully hereinafter set forth.

The roller 6 engaging the cam-way 5 provides for the movement of the forming-bar 8 on the pin 9; and in order to provide for the rotary movement of the plate 11 on the pin 12 to swing the forming-bar 8 horizontally, the rollers 16 are provided which are carried by the bracket 7, said rollers engaging the opposite faces of cam 4, and said cam is provided with the depression 17 and a corresponding convex portion 18 with which the rollers 16 are adapted to engage, and which gives the necessary horizontal movement to the forming-bar 8 for the purposes fully hereinafter set forth.

The forming-block 19 has the arch-forming shoulder 20, around which the upper end of the stay-wire is adapted to be bent by the movement of the forming-pin 15. This forming-block 19 is connected to the movable bar 21 by the dove-tail 22, and any suitable mechanism may be employed for moving the bar 21 to and fro for the purpose fully hereinafter set forth.

The forming-block 19 is further provided with the recess 23, which receives the upper end of the stay-wire *a* as said stay-wire is fed by the pinch rolls A across the strand-wires in the operation of the machine. In line with the forming-block 19 is the block 24 between which and the forming block 19 the stay wire a is held during the bending operation, and at which point the welding of the overlapping arched ends of the stay wires at point 43 takes place. This welding is preferably done electrically, the forming block 19 and the block 24 being the welding points or electrical contacts of a suitable welding circuit which is indicated by the leads 25 and 26. The welding is accomplished after the block 19 has been advanced to clamp the stay wire a and the intersecting end portion of the previously arched stay against the fixed contact block 24. The welding of the stay wires to the top strand wire, and at the other points 43ª, is accomplished in the same manner, the wire being welded at these points between fixed contacts similar to contact 24, and movable contacts 27 which are mounted on the advancing bar 21. Suitable automatic switch mechanism is employed in the welding circuit for making the weld at proper time intervals, and such mechanism may be of any of the well-known types, so that it has not been deemed necessary to illustrate any particular form of switch mechanism in detail.

As clearly indicated in Figs. 3 and 7, the free ends 28 of the upper ends of the arched portions of the stay-wires are now bent in to complete the contour of the arch, and I provide mechanism for doing this which I will now describe: The arm 29 is pivoted by the pin 29ª to the bracket 30. The spring 31 connected to the bracket 30 bears upon the outer end of the arm 29 and holds the outer end of said arm pointed normally downwardly as indicated in Fig. 10. The rear end of arm 29 has the roller 32, which is engaged by the cam member 33 on the slide-bar 34, and any suitable means may be employed for sliding the bar 34 back and forth. The deflector 35 is provided in the path of the intermittently moving fence, said deflector acting to throw the fence outwardly so as to pass the outer end of the arm 29 for the purpose fully hereinafter set forth. The outer end of the arm 29 is beveled as at 36 to provide for disengagement of the arm from the traveling fence more readily.

The strand-wires 37 are fed to the machine from suitable reels and are guided into the machine by the rolls 38; and the stay wires are formed from the stay-wire a which is fed across the strand-wires by pinch-rolls A and are cut off by suitable cutting mechanism, and the fence as it is fabricated, passes up over the drum 40, and down under guide rolls 41 to the drum 42. The drum 40 is built up from a number of sprocket-like sheaves corresponding in number to the number of strand-wires in the fence, and these sheaves are keyed to a shaft having an intermittent movement, the sheaves having fingers or lugs adapted for engagement with the stay-wires. By the movement of this drum the strand-wires are advanced through the machine, and at each stop of the intermittent movement the stay-wire is advanced by the pinch rolls A across the strand-wires and welded thereto.

The operation of the machine is as follows: It will be understood that an intermittent feed is imparted to the strand-wires, and at the point of rest, the welding of the stay-wires to the strand-wires takes place as well as the bending of the upper ends of the stay-wires to form the arched tops. The stay-wire a is fed across the strand-wires and the upper end of the stay-wire passes into the recess 23 of the forming block 19, and extends beyond said forming block as clearly indicated in Fig. 7, so that when said forming-block is advanced the stay-wire is forced into contact with the curved portion of the preceding stay-wire b with its arched top, said wires intersecting at 43, Fig. 7. The wires are held between the forming block 19 and the block 24, and in this position the bending-pin 15 is brought into operation. The cam 4 has been so timed that at this point in the operation, cam-way 5 acting on the roller 6 moves the forming-bar 8 on its pivotal point 9, so that the bending-pin 15 moves into contact with the projecting end of the stay-wire a, and said stay-wire is bent around the arched shoulder 20 of the forming-block. The first part of the movement of the forming pin is in a straight line, and the latter part on a curved line to bend the outer end of said wire around the former. To provide for the inward movement of the bending-pin so that it can assume the position indicated in dotted line, Fig. 7, the rollers 16 being acted on by the groove 17 and convex portion 18 of the cam 4, will act to turn the plate 11 on its pivot 12 and impart a movement to the forming-bar 8, which carries the pin into the position indicated in dotted lines, Fig. 7. The welding of the stay-wires 39 and strand-wires 37 at points 43 and 43ª does not take place simultaneously; but during the period of the uniting operations of the wires at points 43ª, the arching of the outer end of the stay wire just described is performed, and the operation of uniting the stay-wires a and b at the point 43 is performed after the arching operation, and during the period that the forming-pin 15 is returning to its original position.

Simultaneously with the uniting of the strand-wires and the stay-wires, the sliding bar 34 advances and the cam 33 engages the roller 32, causing the outer end of arm 29 to move upwardly, said arm engaging the free end portion 28 of the stay-wire a and moving the same so as to complete the contour of the arch as clearly indicated in Fig. 3. The deflector 35 acts to throw the fence outwardly to permit the fence to pass the arm 29 as clearly indicated in Fig. 10. All this has taken place during the period of rest of the machine, and as soon as these operations have been completed, the fence as well as the strand-wires advances, and the new stay-wire is brought into position, and the operations above described are repeated.

What I claim is:

1. In a wire-fence machine, the combination of means for feeding the strand-wires and stay-wires, means for uniting the same at points of intersection, an arch-shaped former, a forming pin, means for imparting movement to said forming-pin, the first part of said movement being in a straight line and the latter part on a curved line to bend the outer end of said wire around said former, and means for uniting the overlapping arched portions of said stay-wires at a point above the top strand-wire.

2. In a wire-fence machine, the combination of means for feeding the strand-wires and stay-wires, means for uniting the same at points of intersection, an arch-shaped former, a forming pin, a bar supporting said forming-pin, said bar moving in a vertical and a horizontal plane, a cam engaging said bar acting to move said bar, whereby said pin moves in a straight course in the partial bending of the outer end of said stay-wire around said former, and then moves in an arc of a circle to bend said stay-wire around said former.

3. In a wire-fence machine, the combination of means for feeding the strand-wires and stay-wires, means for uniting the same at points of intersection, an arch-shaped former, a forming-pin, a bar in which said pin is mounted, a rotary bracket on which said bar is pivoted, and a rotary cam engaging said bar, whereby said bar is moved on its pivotal point and said bracket is rotated in succession.

4. In a wire-fence machine, the combination of means for feeding the strand-wires and stay-wires, means for uniting the same at points of intersection, means for arching the upper ends of the stay-wires, means for uniting said stay-wires where the arch portions overlap, an arm, and means for moving said arm into contact with the free ends of said stay-wires to close the same.

5. In a wire-fence machine, the combination of means for feeding the strand-wires and stay wires, means for uniting the same at points of intersection, means for arching the upper ends of the stay-wires, means for uniting the overlapping arched ends of said stay-wires at the points of intersection, a pivotally mounted arm, and means for moving said arm into contact with the free ends of said stay-wires to close the same.

6. In a wire-fence machine, the combination of means for feeding the strand-wires and stay-wires, means for uniting the same at points of intersection, means for arching the upper ends of the stay-wires, means for uniting the overlapping arched portions of said stay-wires at points of intersection, a pivotally mounted arm, a cam engaging one end of said arm, means for moving said cam, whereby said arm is moved into contact with the free ends of said stay-wires to close the same.

7. In a wire-fence machine, the combination of means for feeding the strand-wires and stay-wires, means for uniting the same at points of intersection, means for arching the upper ends of said stay-wires, means for uniting the overlapping arched portions of said stay-wires at points of intersection, a spring-actuated pivotally-mounted arm, and means for moving said arm to engage the free ends of stay-wires to close the same.

8. In a wire-fence machine, the combination of means for feeding the strand-wires and stay-wires, means for uniting the same at points of intersection, means for arching the upper ends of said stay-wires, means for uniting the overlapping arched portions of said stay-wires at points of intersection, a spring-actuated arm, means for moving said arm to engage the free ends of said stay-wires to close the same, and a deflector in the path of movement of the fence whereby said fence is moved out of the path of said arm.

In testimony whereof, I the said AUGUST G. JOHNSON, have hereunto set my hand.

AUGUST G. JOHNSON.

Witnesses:
JOHN F. WILL,
J. R. KELLER.